(12) United States Patent
Labschies

(10) Patent No.: US 6,237,409 B1
(45) Date of Patent: May 29, 2001

(54) DEVICE FOR GENERATING A CONTINUOUS STREAM OF BULK MATERIAL AND DETERMINING THE TRANSFER RATE OR BATCH AMOUNT THEREOF

(76) Inventor: Hartmut Labschies, Johann-Valentin-Maystrasse 2, D-64665 Alsbach-Hähnlein (DE)

( * ) Notice: Subject to any disclaimer, the term of this patent is extended or adjusted under 35 U.S.C. 154(b) by 0 days.

(21) Appl. No.: 08/907,364

(22) Filed: Aug. 7, 1997

Related U.S. Application Data

(63) Continuation of application No. PCT/DE96/00163, filed on Feb. 2, 1996.

(30) Foreign Application Priority Data

Feb. 15, 1995 (DE) ................................. 195 04 992

(51) Int. Cl.⁷ ................. G01F 3/24; G01F 1/84
(52) U.S. Cl. ................. 73/218; 73/861.351; 73/861.354; 222/77
(58) Field of Search ............................. 73/218, 244, 259, 73/861.351, 861.353, 861.354; 222/77, 410, 414

(56) References Cited

U.S. PATENT DOCUMENTS

| | | | |
|---|---|---|---|
| 3,805,904 | 4/1974 | Zimmerer . | |
| 4,805,462 | * 2/1989 | Labschies | ........................ 73/861.351 |
| 5,289,724 | * 3/1994 | Häfner | ..................................... 73/218 |
| 5,353,647 | * 10/1994 | Toerner | ........................... 73/861.354 |
| 5,394,747 | * 3/1995 | Häfner | ..................................... 73/218 |

FOREIGN PATENT DOCUMENTS

362 542 6/1962 (CH) .
0 292 723 11/1988 (EP) .
0 615 113 9/1994 (EP) .

* cited by examiner

Primary Examiner—Harshad Patel
(74) Attorney, Agent, or Firm—Shlesinger, Arkwright & Garvey LLP

(57) ABSTRACT

The invention concerns a device for producing a stream of bulk material, which device is designed so that bulk material is introduced through a pipe axially into a rotating pot. Owing to acceleration and centrifugal force the bulk material moves toward the edge region of the pot and fills the entire pot up to the axial inlet. In the edge region of the pot a blade disposed on a non-rotating part of the pot dips into the rotating material cake in the opposite direction to the rotation thereof, so leading the stream of bulk material out. The device can be used wherever bulk materials have to be measured and metered. The device is flanged directly onto the outlets of existing silos.

25 Claims, 1 Drawing Sheet

DEVICE FOR GENERATING A CONTINUOUS STREAM OF BULK MATERIAL AND DETERMINING THE TRANSFER RATE OR BATCH AMOUNT THEREOF

This application is a continuation of International Application No. PCT/DE96/00163, filed on Feb. 2, 1996.

SPECIFICATION

The invention finds application in technology for batch measurement by weight and concerns a device for determining in particular the transfer rate and/or the metered-out amount of a continuously generated stream of bulk material.

Known from DE-OS 3634994 is a centrifuge in which the fluid separated from the suspension is removed to the rotating periphery of the drum and the kinetic energy remaining therein is recovered through external devices. However, such a device is not usable for bulk materials.

In a known device for metering out bulk material (CH-PS 362 542) the bulk material passes from an intake funnel onto a rotating disc with a perpendicular axis and is led on this from the feed point to a removal point, where it is stripped off the rotating disc by means of a stripper. The rotating disc is arranged upon a weighing device, with which the weight of the bulk material on the rotating disc can be determined. Such a device has only a limited measuring precision and an overall size that is too large in relation to the achievable transfer rate.

In view of the fact that a small overall size is to be achieved, the task forming the basis for the invention is to generate a small stream of bulk material with high velocity (similar to a water stream from a nozzle), which stream can then finally be directed towards a suitable measuring apparatus. The measuring apparatus deflects the bulk-material stream and, from the centrifugal force resulting thereby, determines the transfer rate, which is used for the metering out of the bulk material. This task is accomplished by causing bulk material to flow into a rotating cylindrical vessel adjacent its axis, and using an inclined blade adjacent the inner periphery of the vessel to lift material from the vessel and direct it into a trajectory impinging upon a deflecting element which develops a reaction force which can be measured and is proportional to the rate at which material impinges on the element.

Suitable as measuring apparatus and sufficiently well-known in bulk-material technology are flow-through measuring devices with bent chutes or impact plates, which deflect the bulk material (as known from DE 2947414).

A further measuring apparatus is known from DE 3717615. Here, through a sensible arrangement of the measuring wheel mentioned therein, for the invention at issue the bulk-material stream can be directly coupled into the measuring wheel.

The device for producing a stream of bulk material makes provision for bringing the bulk material into a rotating pot axially through a tube. The bulk material moves towards the edge zone of the pot owing to acceleration and centrifugal force, and ultimately fills the entire pot up to the axial entrance.

A blade arranged on a non-rotating part of the pot dips into the rotating material cake in a counter-rotating manner in the edge zone and in doing so leads the bulk-material stream out.

Attainable advantages and features of such an arrangement include the following:

The device according to the invention may be implemented so as to be sealed.

Bulk materials from dusts up to small granules can thus be adequately measured or metered out in a manner friendly to the environment.

The device requires no flexible connections such as those that solve problems of ventilation and pressure compensation in the known systems in bulk-material measurement technology.

The device can have a very low overall height.

It is suitable for being directly connected by means of a flange onto silo outlets on the side of the structure, but can also be supported on the floor.

The bulk-material stream is free of pulsations and it is distinguished by a highly constant product flow.

The device provides a direct and quick measurement and regulation apparatus and can work virtually without idle time, in consequence of the high bulk-material velocity (e.g. 10 m/sec.).

The measurement apparatus can have small dimensions in relation to the achievable transfer rate.

DESCRIPTION OF THE PREFERRED EMBODIMENT

Figure 1:
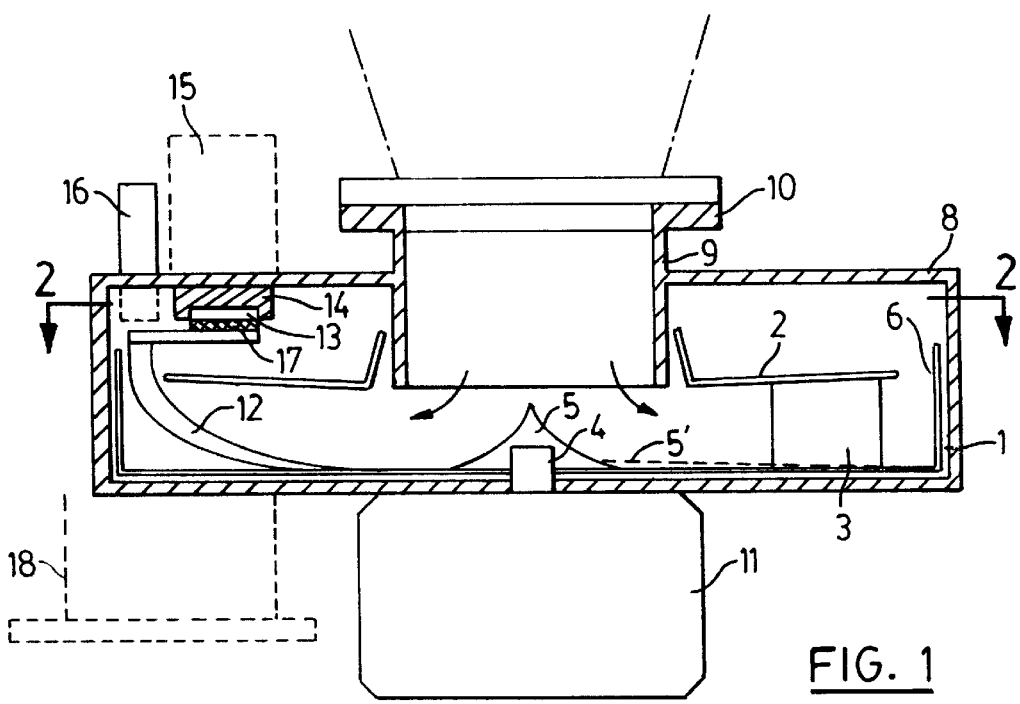
FIG. 1 shows a vertical section through the implementation form of the invention with a bulk-material supply from a silo.

The device represented in FIG. 1 is composed of rotating and stationary parts.

The rotating parts include the pot 1, which is vertically mounted on a shaft 4 of a drive motor 11 in a floating manner. With the pot 1 rotates a lid 2, which as shown in the drawing is dished downwardly into the pot to limit upward movement the bulk material on its way from the center to the edge zone of the pot and prevents the bulk material from spreading out in the pot in an uncontrolled manner.

The lid is inclined upwardly towards the circumference of the pot. By this means better flow characteristics are attained, even when the bulk material has been compressed due to centrifugal force. It is helpful when a flank of a central material distributing cone 5 is towards the peripheral wall of the pot 1, as represented in the drawing by a broken line 5'.

The bulk material streaming in vertically is deflected by the central cone 5 away from the dead-center zone in a horizontal direction. The central cone 5 is provided with a bore for engaging the drive shaft 4.

If required, the central cone carries an attached mixer (not shown) as an aid to bulk-material entry.

The lid 2 is connected to the bottom of the pot 1 by means of sturdy connecting bridges 3. The lid 2 leaves a gap 6 adjacent the inner peripheral wall of the pot 1.

The stationary parts include the surrounding housing 8 with the drive motor 11 mounted vertically by means of a flange, as well as the inlet connecting piece 9 with a flange 10 set upon it. The inlet connecting piece 9 is firmly attached to the housing 8 and has an inlet cross section is smaller than the outlet cross section.

Figure 2:
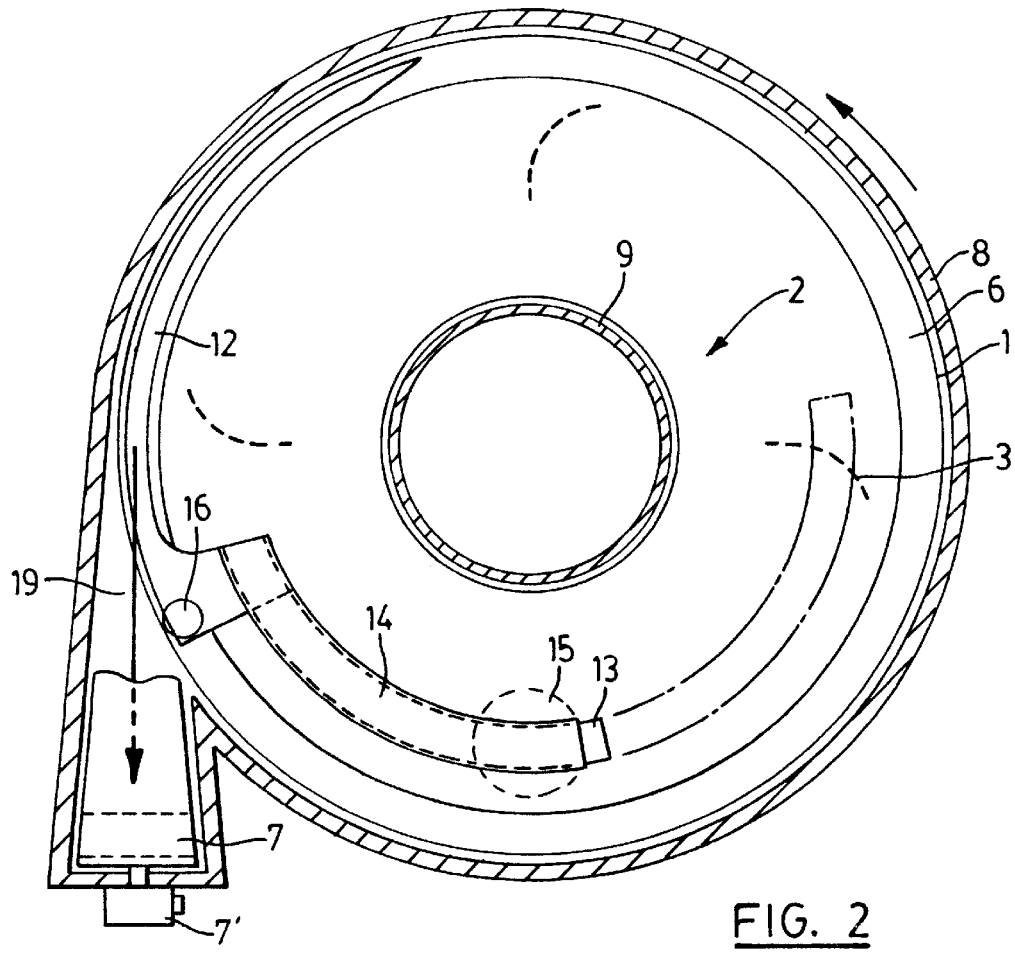
FIG. 2 shows an axial section of the implementation form according to FIG. 1.

The blade 12 dips obliquely downward into the gap 6 and at its upper end is firmly connected to a glide rail 13. In FIG. 1 the blade 12 is represented maximally dipped in. The glide rail 13 is guided in the glide bearing 14. The glide bearing 14 is attached to the underside of the top of the housing 8. Glide rail and glide bearing 13/14 are curved in construction and arranged obliquely inclined in such a manner that upon movement of the glide rail 13 the connected blade 12 can being inclined to the required degree relative to the cylindrical wall of the pot 1 (see FIG. 2).

Screwed onto the surface of the housing is an adjusting motor 15, which projects with its drive shaft into the slide rail 13 and adjusts this as appropriate to the right or left.

Also screwed onto the surface of the housing is an oscillation exciter 16, which extends to the blade 12 excitation and causes this to oscillate. To this end the blade 12 is connected to the slide rail 13 via a rubber-metal connection 17. The leading out of the bulk material is assisted to the excitation of the blade 12. The blade 12 has a form adapted appropriately to the flow and friction characteristics of the bulk material.

The bulk material, having been led out on a tangential trajectory 19 through an outlet duct of the housing 8 extending tangentially of the housing so as to surround the trajectory 19, strikes the deflector chute 7, the horizontal reaction which is sustained by a weighing element 7'. The weighing element 7' is fastened to the housing 8 on the outside. The deflector chute can be suspended from the top of the housing by means of leaf springs or mounted directly on the weighing element. The deflected material drops through an outlet chute 18 (see FIG. 1) together with material escaping into the housing 8 from the vessel 1.

What is claimed is:

1. A device for determining rate of flow or batch amount of a continuous stream of bulk material, comprising:
   a cylindrical vessel having bottom and peripheral walls and rotatable about a vertical axis,
   a blade inclined into the vessel inwardly adjacent said peripheral wall and relative to which the vessel rotates;
   a vertically-disposed inlet pipe coaxial with the vessel, said pipe having two ends, one end receiving bulk material and the other end discharging bulk material into the vessel,
   a drive motor to rotate the vessel at a rate such as to displace material discharged from the pipe onto the bottom wall towards the peripheral wall by centrifugal force and such as to drive material adjacent the peripheral wall onto the blade which is oriented to direct such material into a stream leading out of the vessel, and
   a measuring apparatus located outside the vessel in the path of the stream, including an element intercepting the stream of material and means to measure a reaction force developed by said element.

2. A device according to claim 1, wherein the intercepting element is a measuring chute, and the means to measure sustains a horizontal reaction force developed by the chute.

3. A device according to claim 1, wherein the inlet pipe has a cross-section which tapers towards said other end.

4. A device according to claim 1, wherein a dished lid depends into the cylindrical vessel, leaving a gap between it and the peripheral wall of the vessel.

5. A device according to claim 4, wherein there is a reduced clearance between the lid and the vessel at a centre of the lid.

6. A device according to claim 1, wherein the blade extends along an inner surface of the peripheral wall with an inclination that is adjustable, the blade having with an upper surface which is a segment of an ellipse inclined relative to the axis of the vessel.

7. A device according to claim 6, wherein the blade is connected to a prorated rail, and an actuator acts on the rail to control the inclination of the blade.

8. A device according to claim 1, including a mechanical oscillator coupled to the blade to apply vibration to the latter.

9. A device according to claim 1, wherein the cylindrical vessel and associated parts are closely enclosed within a housing.

10. A device according to claim 9 wherein the housing defines an exit duct surrounding the trajectory into which the material is deflected by the blade.

11. A device according to claim 10, wherein the exit duct also receives material escaping into the housing from the vessel.

12. A device for determining rate of flow or batch amount of a continuous stream of bulk material, comprising:
    a housing,
    a cylindrical vessel disposed within said housing, said vessel having bottom and peripheral walls and rotatable about a vertical axis,
    a blade inclined into said vessel inwardly adjacent said peripheral wall and relative to which said vessel rotates,
    a vertically-disposed inlet pipe coaxial with said vessel, said pipe having two ends, one end receiving bulk material and the other end discharging bulk material into said vessel,
    a drive motor to rotate said vessel at a rate such as to displace material discharged from said pipe onto said bottom wall towards said peripheral wall by centrifugal force and such as to drive material adjacent said peripheral wall onto said blade which is oriented to direct such material into a stream having a path leading out of said vessel and said housing, and
    a measuring apparatus located outside said housing in the path of the stream.

13. A device according to claim 12, and further comprising:
    a chute attached to said housing, and
    said measuring apparatus is disposed in said chute.

14. A device according to claim 12, wherein:
    said blade includes one end secured near a top portion of said vessel, and
    said blade includes another end disposed toward said bottom of said vessel.

15. A device according to claim 12, and further comprising:
    a dished lid disposed sunken within said vessel, said lid having a peripheral edge spaced from said peripheral wall of said vessel to define a gap therebetween.

16. A device according to claim 15, wherein:
    said blade is movable into said gap along an inner surface of said peripheral wall of said vessel toward said bottom of said vessel such that a path traced by said blade is a partial segment of an ellipse defined by an imaginary oblique sectional plane through said cylindrical vessel.

17. A device according to claim 16, and further comprising:
    a glide bearing,
    a glide rail operably secured to said glide bearing,
    said blade is secured to said glide rail, and
    said glide bearing and said glide rail are configured such that movement of said glide rail along said glide bearing causes said blade to trace out said partial segment of an ellipse along said inner surface of said vessel.

18. A device according to claim 17, wherein:

said glide bearing and said glide rail are curved and obliquely inclined.

19. A device as in claim 12, and further comprising:

an oscillation exciter operably associated with said blade to cause vibration of said blade.

20. A device for conditioning bulk material for application to a flow rate measurement device including an element intercepting a stream of the material and means to measure a reaction force developed by said element, said device comprising:

a cylindrical vessel having bottom and peripheral walls and rotatable about a vertical axis, a blade inclined into the vessel inwardly adjacent said peripheral wall and relative to which the vessel rotates, a vertically disposed inlet pipe coaxial with the vessel, said pipe having two ends, one end receiving bulk material and the other end discharging bulk material into the vessel, a drive motor to rotate the vessel at a rate such as to displace material to discharged from the pipe onto the bottom wall towards the peripheral wall by centrifugal force and such as to drive material adjacent the peripheral wall onto the blade which is oriented to direct such material into a stream leading tangentially out of the vessel to form said stream impinging on the intercepting element of the measurement device.

21. A device according to claim 20, and further comprising:

a dished lid disposed sunken within said vessel, said lid having a peripheral edge spaced from said peripheral wall of said vessel to define a gap therebetween.

22. A device according to claim 21, wherein:

said blade is movable into said gap along an inner surface of said peripheral wall of said vessel toward the bottom of said vessel such that a path traced by said blade is a partial segment of an ellipse defined by an imaginary oblique sectional plane through said cylindrical vessel.

23. A device according to claim 22, and further comprising:

a glide bearing, a glide rail operably secured to said glide bearing, said blade is secured to said glide rail, and said glide bearing and said glide rail are configured such that movement of said glide rail along said glide bearing causes said blade to trace out said partial segment of an ellipse along said inner surface of said vessel.

24. A device according to claim 23, wherein:

said glide bearing and said glide rail are curved and obliquely inclined.

25. A device as in claim 20, and further comprising:

an oscillation exciter operably associated with said blade to cause vibration of said blade.

* * * * *